(No Model.)
N. O. TIFFANY.
Tray for Fruit Driers.
No. 230,507. Patented July 27, 1880.
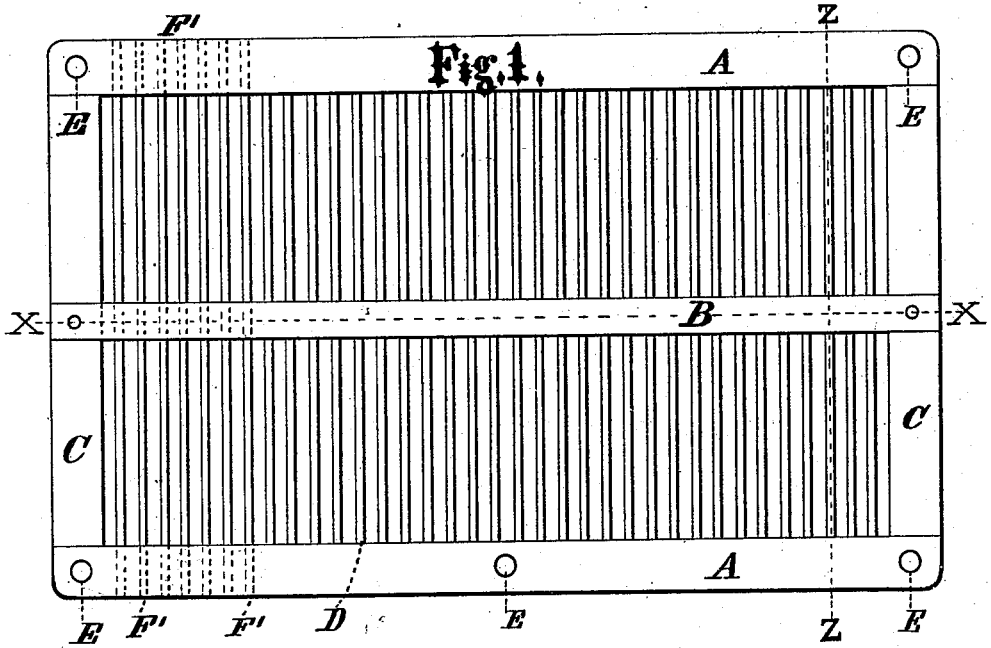
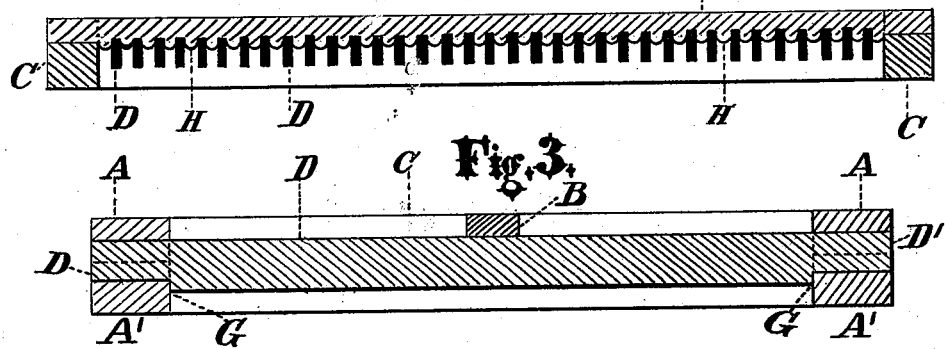
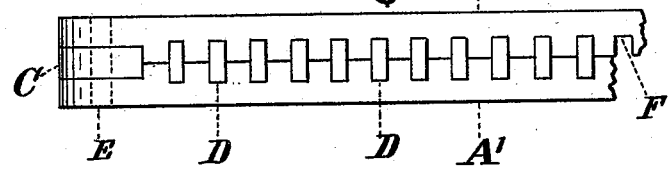
Witnesses.
Dan H Butis.
Hugh Sangster
Inventor.
Nelson O. Tiffany.
By James Sangster
Atty.

United States Patent Office.

NELSON O. TIFFANY, OF BUFFALO, NEW YORK, ASSIGNOR TO OSCAR F. TIFFANY, OF SAME PLACE.

TRAY FOR FRUIT-DRIERS.

SPECIFICATION forming part of Letters Patent No. 230,507, dated July 27, 1880.

Application filed April 30, 1880. (No model.)

*To all whom it may concern:*

Be it known that I, NELSON O. TIFFANY, a citizen of the United States, residing in the city of Buffalo, in the county of Erie and State of New York, have invented certain new and useful Improvements in Trays for Drying Fruit or other similar materials, of which the following is a specification.

The object of my invention is to provide a cheap durable wooden tray for drying fruit, vegetables, or other materials; and it consists of a frame of wood having two of its sides composed of two parts, one or both parts having a series of transverse slots or grooves arranged at a suitable distance apart to receive a series of thin strips of wood set up edgewise, the ends of each strip being provided with a tenon to prevent it from being moved longitudinally or out of the frame; the whole being combined and fastened together, as will be more clearly hereinafter shown by reference to the drawings, in which—

Figure 1 is a plan or top view of a tray complete; Fig. 2, a section through line X X, Fig. 1; Fig. 3, an enlarged section through line Z Z, Fig. 1; and Fig. 4 represents an enlarged side elevation of a portion of a tray.

A represents the upper sides of the double portions of the frame, and A' the lower sides of the same, both parts of which are provided with slots or grooves F, (see Fig. 4 and the dotted lines F' in Fig. 1,) into which the ends D' of the thin wooden strips D are fitted, (see Fig. 3,) the shoulders or tenons G preventing them from moving longitudinally or getting loose.

To prevent the strips D from warping or bending, so as to spring together or too far apart, a notched piece, B, is fastened to the ends C of the frame, as shown in Figs. 1, 2, and 3, so that one side of the strips D will fit into the notches, and thereby be firmly held in place by the teeth or projections H, which fit into the space between said strips, as shown in Fig. 2.

Heretofore trays, screens, or sieves made of galvanized wire or netting have been used, also inferior trays, made of wood, all of which are objectionable as follows: The acid from the fruit removes the galvanizing from the wire, leaving it coated with the juices of the fruit, which is immediately followed by a chemical action, producing a black slimy substance that corrodes the wire, marks the fruit, and imparts to it a poisonous property and a metallic taste, thereby destroying much of the natural flavor. The netting is objectionable on account of the cost, the time required to keep the sieves in repair, and the difficulty in removing the fruit without breaking. The extreme heat required in driers and evaporators, with the frequent wetting and drying, rapidly destroys the fiber of the netting and renders it worthless.

The objection to the wood trays formerly used is the great expense of preparing the material and putting them together, and the difficulty of replacing broken strips; also the weakening of the wood by cutting for interlocking.

The objections to trays made of wood with strips or bars held in position by wire is in the cost of placing the wire around the pieces, as the wires appear to burn the wood, as the wood becomes charred wherever the metal is in contact with it.

My tray is therefore put together by wooden pins E; but, if desired, nails or screws may be used. The parts A A', when together, bring the grooves F opposite each other, and form mortises, into which the tenons of the strips D are fitted and securely held in place. In some cases, when the trays are small, the strip or bar B may be dispensed with.

It is obvious that in case any of the strips D should be broken the sides A A' can be easily separated and a new piece inserted.

I claim as my invention—

1. A wooden tray for drying fruit or other similar materials, consisting of a frame composed of the parts C and the sides A A', provided with grooves, substantially as specified, in combination with a series of strips, D, and a notched bar, B, as and for the purposes described.

2. In a fruit-drying tray, the combination of the parts C with the sides composed of the parts A A' and a series of strips, D, connected thereto, substantially as and for the purposes described.

N. O. TIFFANY.

Witnesses:
 JAMES SANGSTER,
 HUGH SANGSTER.